United States Patent
Melton et al.

(10) Patent No.: US 9,115,585 B2
(45) Date of Patent: Aug. 25, 2015

(54) SEAL ASSEMBLY FOR GAS TURBINE

(75) Inventors: Patrick Benedict Melton, Horse Shoe, NC (US); David William Cihlar, Greenville, SC (US)

(73) Assignee: General Electric Company, Schenectady, NY (US)

( * ) Notice: Subject to any disclaimer, the term of this patent is extended or adjusted under 35 U.S.C. 154(b) by 537 days.

(21) Appl. No.: 13/153,790

(22) Filed: Jun. 6, 2011

(65) Prior Publication Data
US 2012/0306166 A1 Dec. 6, 2012

(51) Int. Cl.
*F01D 9/02* (2006.01)
*F16J 15/32* (2006.01)

(52) U.S. Cl.
CPC ............. *F01D 9/023* (2013.01); *F16J 15/3292* (2013.01); *F05D 2240/57* (2013.01)

(58) Field of Classification Search
CPC ....................................................... F01D 9/023
USPC ....................... 277/355, 632, 630; 415/214.1; 60/39.37, 752
See application file for complete search history.

(56) References Cited

U.S. PATENT DOCUMENTS

| | | | | |
|---|---|---|---|---|
| 3,856,077 A * | 12/1974 | Siegla | ................................ | 165/9 |
| 5,118,120 A * | 6/1992 | Drerup et al. | .................. | 277/628 |
| 5,192,185 A * | 3/1993 | Leonard | ...................... | 415/170.1 |
| 5,265,412 A | 11/1993 | Bagepalli et al. | | |
| 5,509,669 A * | 4/1996 | Wolfe et al. | ..................... | 277/654 |
| 5,542,684 A * | 8/1996 | Squirrell | ........................ | 277/411 |
| 5,657,998 A * | 8/1997 | Dinc et al. | ..................... | 277/653 |
| 5,799,953 A * | 9/1998 | Henderson | ..................... | 277/554 |
| 5,915,697 A * | 6/1999 | Bagepalli et al. | ............. | 277/627 |
| 6,162,014 A * | 12/2000 | Bagepalli et al. | ........... | 415/170.1 |
| 6,164,656 A * | 12/2000 | Frost | .............................. | 277/312 |
| 6,402,466 B1 * | 6/2002 | Burdgick et al. | ........... | 415/173.3 |
| 6,464,232 B1 * | 10/2002 | Marchi et al. | .................. | 277/630 |
| 6,464,457 B1 * | 10/2002 | Morgan et al. | .............. | 415/174.2 |
| 6,547,257 B2 * | 4/2003 | Cromer | .......................... | 277/630 |
| 7,172,388 B2 * | 2/2007 | Synnott | .......................... | 415/135 |
| 2002/0121744 A1 * | 9/2002 | Aksit et al. | ...................... | 277/411 |
| 2002/0163134 A1 | 11/2002 | Cromer | | |
| 2003/0039542 A1 * | 2/2003 | Cromer | .......................... | 415/135 |
| 2003/0123982 A1 * | 7/2003 | Aksit et al. | ...................... | 415/191 |
| 2006/0045746 A1 * | 3/2006 | Synnott | ...................... | 416/219 R |
| 2008/0053107 A1 | 3/2008 | Weaver et al. | | |
| 2009/0115141 A1 * | 5/2009 | Simmons | ....................... | 277/630 |
| 2009/0212504 A1 | 8/2009 | Chila et al. | | |
| 2010/0007093 A1 * | 1/2010 | Grondahl | ....................... | 277/500 |
| 2010/0054928 A1 | 3/2010 | Schiavo | | |
| 2010/0215476 A1 * | 8/2010 | Byrne et al. | ................... | 415/116 |
| 2010/0247286 A1 * | 9/2010 | Maldonado | ....................... | 415/1 |
| 2011/0008156 A1 * | 1/2011 | Prentice et al. | ............... | 415/200 |
| 2011/0014029 A1 | 1/2011 | Venkataraman et al. | | |
| 2012/0234018 A1 * | 9/2012 | Cihlar et al. | ..................... | 60/796 |
| 2013/0227964 A1 * | 9/2013 | Willis et al. | ..................... | 60/806 |

OTHER PUBLICATIONS

EP Search Report and Written Opinion dated Mar. 11, 2014 issued in connection with corresponding EP Application No. 12170185.8.

* cited by examiner

*Primary Examiner* — Kristina Fulton
*Assistant Examiner* — L. Susmitha Koneru
(74) *Attorney, Agent, or Firm* — James W. Pemrick; Ernest G. Cusick; Frank A. Landgraff

(57) ABSTRACT

A seal assembly is provided having a retention assembly attached to a first component, and a seal element secured by the retention assembly. The seal element comprises at least one leaf seal, and the leaf seal is comprised of a plurality of tabs in series with a plurality of slots. The seal assembly forms a flexible seal between the first component and a second component.

18 Claims, 5 Drawing Sheets

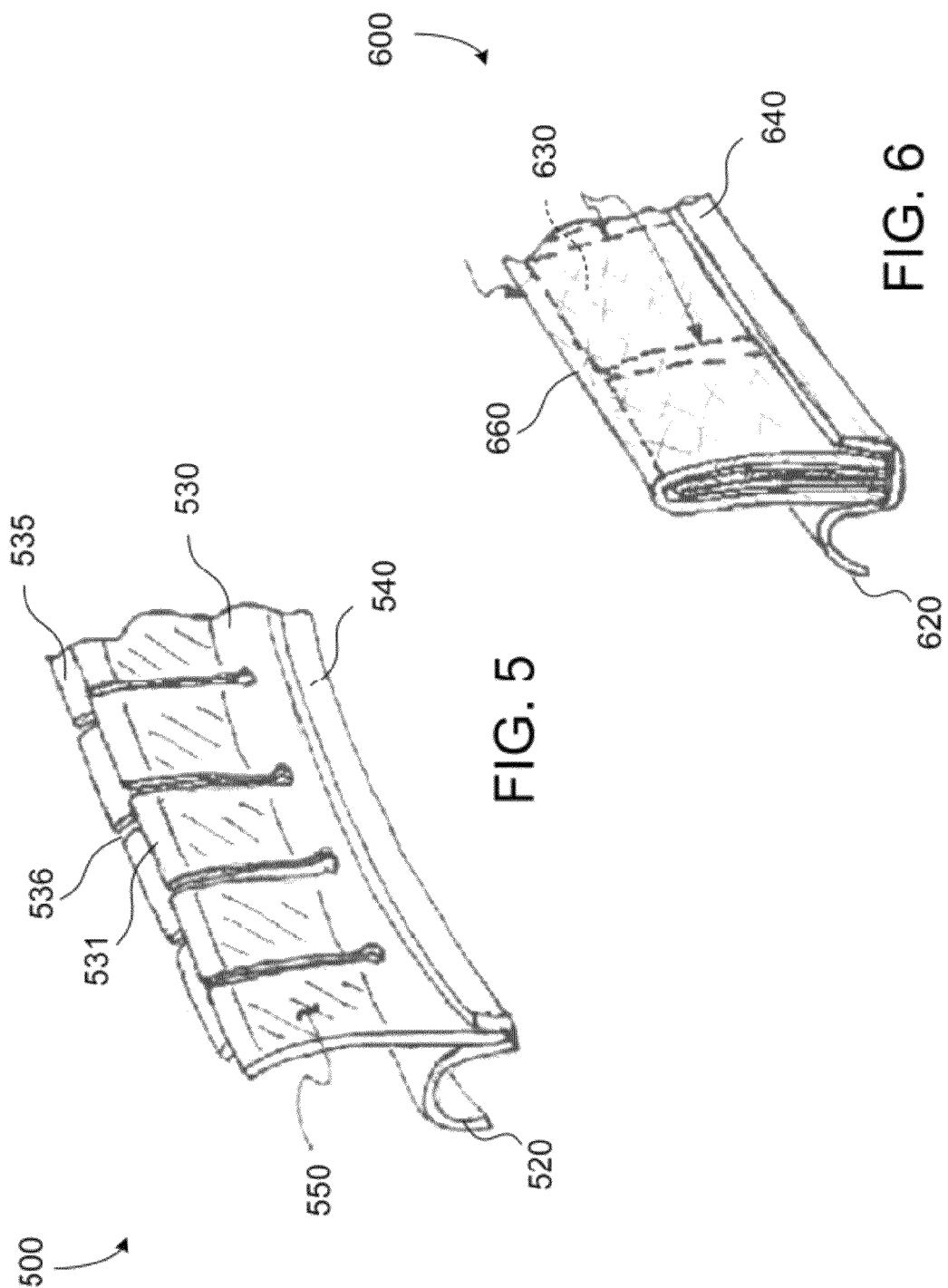

SEAL ASSEMBLY FOR GAS TURBINE

BACKGROUND OF THE INVENTION

The subject matter disclosed herein relates to a seal assembly for a gas turbine. In particular, the invention relates to seal assemblies between hot gas path parts, such as, but not limited to, transition pieces and first stage nozzles of gas turbines.

Seals are used to minimize leakage of fluids. One known seal has a generally impervious shim assemblage and a cloth assemblage generally surrounding the shim assemblage. Cloth seals may be used in many applications including, but not limited to, seal assemblies for steam turbines and gas turbines used for power generation and seal assemblies for gas turbines used for aircraft and marine propulsion.

A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine area of a gas turbine will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between larger gas turbine components such as through gaps between the combustor and the turbine, and gas-path leakage occurs through gaps between smaller gas turbine components such as through gaps between combustor casing segments. Such components have surfaces of different shapes, suffer from assembly misalignment, and undergo vibration. For example, vibration is particularly important during startup of a turbine rotor which must pass through one or more critical frequencies before reaching operational speed. Also, hot section components, such as combustors and turbines, thermally experience hot gas flow and typically undergo different thermal growths. Steam path leakage occurs through gaps between steam turbine components in a manner similar to that for gas-path leakage through gaps between gas turbine components.

Cloth seal installations have been proposed for use in gas-path leakage gaps of gas turbines and for use in steam-path leakage gaps of steam turbines. However, such conventional cloth seal assemblies cannot handle large changes in the size of the leakage-path gap between the two components and therefore have not been proposed for use in such "large gap change" applications. A conventional cloth seal assembly used in such a "large gap change" application would have the cloth seal become crimped (i.e., nonelastically bent) when the gap between the two components became very small and thereafter would not seal when the gap returned to normal or became very large.

Conventional seals used in such "large gap change" applications include a conventional rigid seal made of metal which may have a leakage of 2.4% (primarily from flow around the seal due to different surface shapes, assembly misalignment, vibration, thermal growth, and/or wear). Such leakage in the combustor may result in a 15 (or much higher) parts-per-million (ppm) NOx production and a similar CO production. It is noted that conventional rigid seals do not conform well to the variations in thermal growth or contraction of the various turbine components.

BRIEF DESCRIPTION OF THE INVENTION

According to one aspect of the present invention, a seal assembly is provided having a retention assembly attached to a first component, and a seal element secured by the retention assembly. The seal element comprises at least one leaf seal, and the leaf seal is comprised of a plurality of tabs in series with a plurality of slots. The seal assembly forms a flexible seal between the first component and a second component.

According to another aspect of the present invention, a seal assembly is provided having a seal element comprising at least one leaf seal, the leaf seal is comprised of a plurality of tabs in series with a plurality of slots. The seal assembly forms a flexible seal between the first component and a second component.

These and other features will become apparent from the following detailed description, which, when taken in conjunction with the annexed drawings, where like parts are designated by like reference characters throughout the drawings, and disclose embodiments.

BRIEF DESCRIPTION OF THE DRAWINGS

FIG. 5 illustrates a partial perspective view of a seal assembly, according to another aspect of the present invention; and FIG. 6 illustrates a partial perspective view of a seal assembly, according to another aspect of the present invention.

DETAILED DESCRIPTION OF THE INVENTION

Figure 1:
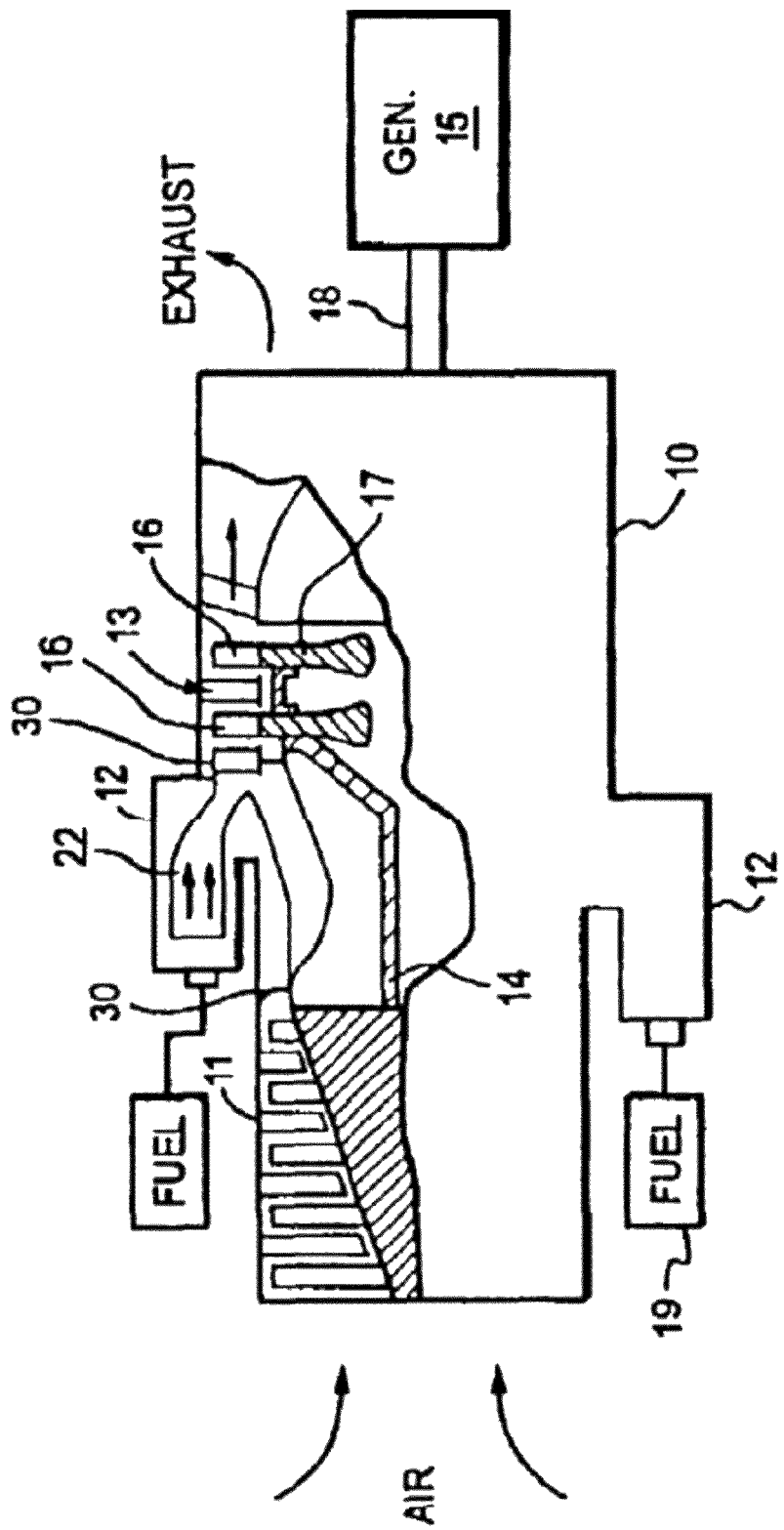
FIG. 1 illustrates an exemplary gas turbine comprising a combustion system, with a section of the turbine being cut-away to illustrate internal components of the gas turbine.

The gas turbine 10, depicted in FIG. 1, includes a compressor 11, combustion system 12, and a turbine portion 13. The compressor 11, combustion system 12, and turbine 13 are disposed about at least one of rotatable shaft 14. Atmospheric air enters the gas turbine 13 to be pressurized, heated and expelled to provide usable power output. The output power can be provided to a power-driven machine or an associated power-generating machine, such as, but not limited to, an electric generator 15. The specification will refer to an electric generator 15, however this description is not intended to limit the scope of this application and claims in any manner. It is merely exemplary of the power-driven machine.

The compressor 11 provides pressurized air to the combustion system 12. Fuel is provided to the combustion system 12 from a fuel system 19. The fuel can be mixed with pressurized air in a combustion chamber 20 to generate combustion gases and heat energy. The combustion gases flow away from the combustion chamber 20 to the turbine 13. The combustion gases flow through an annular arrays) of turbine blades 16, which are mounted on disks or wheels 17. These wheels 17 rotate with a respective shaft 14. The rotation of shaft 14 turns the compressor 11, which in turn compresses the air to feed the combustion process. Also, rotation of the shaft 14 can also provide a rotational output 18 from the turbine 13 to the generator 15 or other system.

Figure 2:
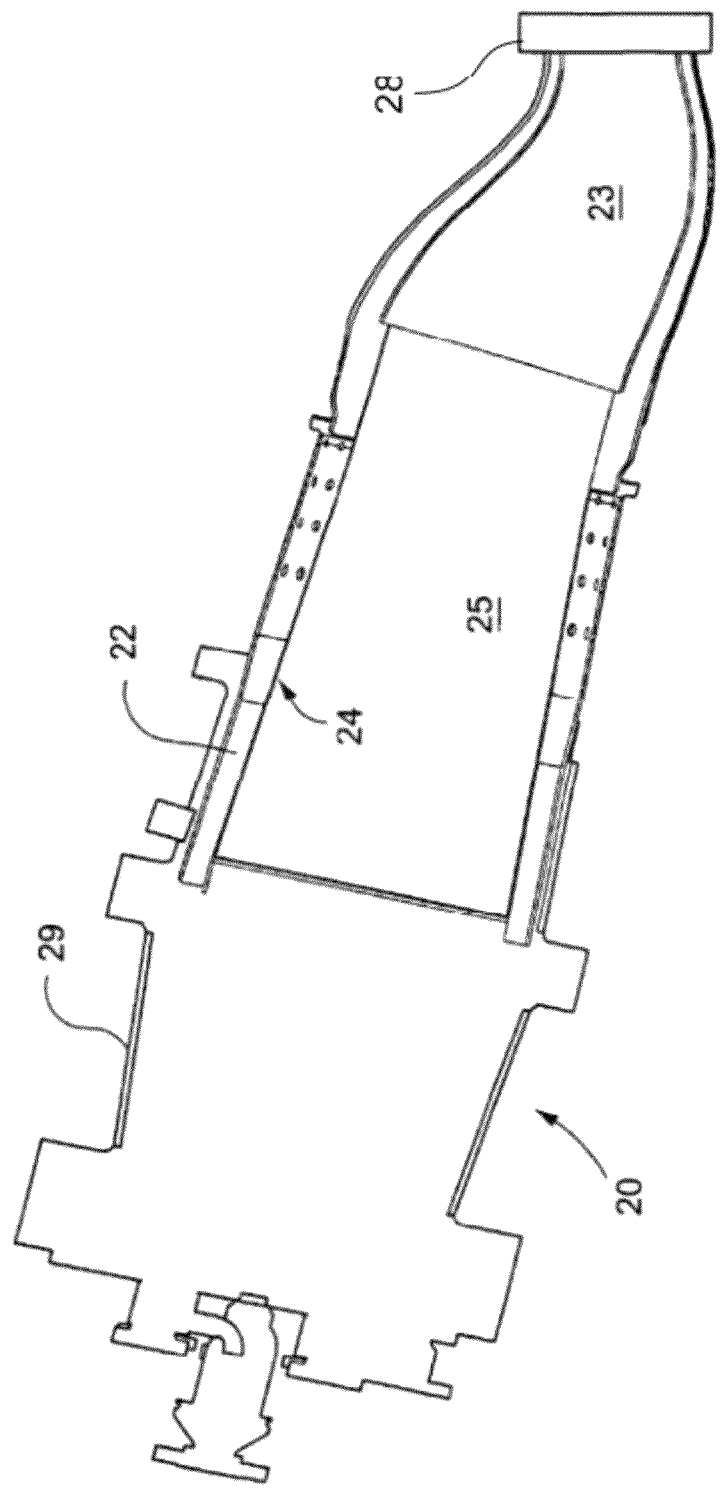
FIG. 2 illustrates a schematic cross-sectional view of an exemplary gas turbine combustion system, including the combustion liner and transition piece.

FIG. 2 illustrates one embodiment of combustion chamber 20, which comprises part of the circular array of combustion chambers 20. These combustion chambers 20 are disposed around the center of the turbine 13 that is included in the combustion system 12. The combustion chamber 20 comprises a compressed air inlet duct, a flow sleeve 22, and combustion gas exhaust duct or transition piece 23 to direct combustion air to the turbine 13. The flow sleeve 22 houses a combustion liner 24, and in turn the combustion liner 24 defines a combustion zone 25.

A combustion casing 29 is provided in the combustion system and houses each of the combustion chambers 22. The combustion casing 29 attaches a combustion chamber 22 to a housing 30 of the gas turbine, as illustrated in FIG. 1. The combustion liner 24 is coaxially mounted within the flow sleeve 22. The combustion liner 24 and flow sleeve 22 are both coaxially mounted within the combustion casing 29. The flow sleeve 22 is mounted in the combustion casing 29 by any appropriate means, such as, but not limited to, mounting brackets.

The combustion liner 24 comprises a generally conical or frusto-conical configuration having an inlet end that is generally aligned with a fuel nozzle. The combustion liner 24 also defines an exhaust end. The exhaust end of the combustion liner 24 is coupled to the transition piece 23 to define a flow passage for combustion gases from the combustion system. The transition piece 23 comprises a generally conical or frusto-conical configuration having an inlet end that is generally aligned with the exhaust end of the combustion liner 24. The transition piece 23 also defines an exhaust end. The exhaust end of the transition piece 23 is coupled to the stage one nozzle 28 of turbine 13.

The combustion liner 24 and transition piece 23 may be formed via a casting process in a one-piece or unitary construction. Thus the one-piece or unitary construction does not comprise metallurgical connecting means, such as but not limited to, brazing or welding, as evident in known combustion liner configurations. In other words, in some applications combustion liner 24 and transition piece 23 are not assembled from two or more components or parts, as they are single parts. However, in other applications the combustion liner 24 and transition piece 23 may be formed of multiple parts connected together.

Figure 3:
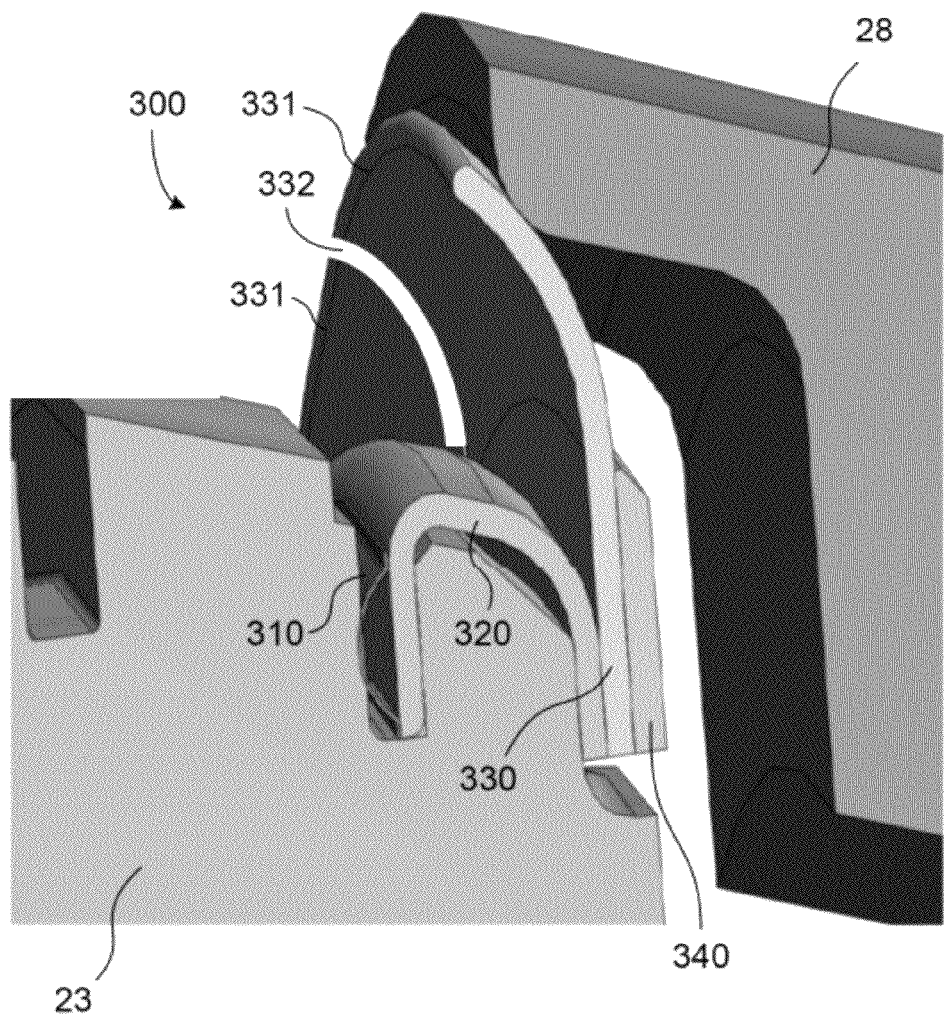
FIG. 3 illustrates a partial cross-sectional view of the seal between the aft frame of the transition piece and the stage one nozzle, according to one aspect of the present invention.

FIG. 3 illustrates a partial cross-sectional view of the seal between the aft frame of the transition piece and the stage one nozzle. According to one aspect of the present invention, the seal assembly 300 may be comprised of multiple layers or elements, which may include spring seal 310, retaining member 320, leaf seal 330 and retaining plate 340. A retention assembly may be comprised of the spring seal 310, retaining member 320 and retaining plate 340, and this retention assembly is attached to a first component. The first component could be the aft end or exhaust end of the transition piece 23 (as shown), or it could be the first stage nozzle 28 (not shown in FIG. 3). A seal element is secured by the retention assembly 310, 320, 340, and includes at least one leaf seal 330. The retaining plate 340 may be configured to secure the leaf seal 330 to the retaining member 320. The leaf seal 330 has a partially segmented construction and is formed of a plurality of tabs 331 in series with a plurality of slots 332. The seal assembly 300 forms a flexible seal between the first component 23 and the second component 28, which in this example is the transition piece 23 and first stage nozzle 28, respectively. The segmented or tabbed configuration of leaf seal 330 provides excellent sealing characteristics as it gives flexibility to the seal, and allows the seal to accommodate various changes in shapes of the components due to thermal cycling.

The retaining member 320 is disposed around a portion of the first component (e.g., transition piece 23) and includes a spring seal 310 attached to the retaining member. The spring seal 310 applies a compressive force to a portion of the retaining member 320 and a portion of the first component or transition piece 310. One possible leakage path is from the gap between the transition piece and first stage nozzle (shown in the lower right portion of FIG. 3), under the retaining member 320 and past spring seal 310. The construction of the spring seal 310 forms a tight seal between the transition piece 23 and the respective portions of the spring seal 310 and retaining member 320 to reduce leakage flow along this path.

Figure 4:
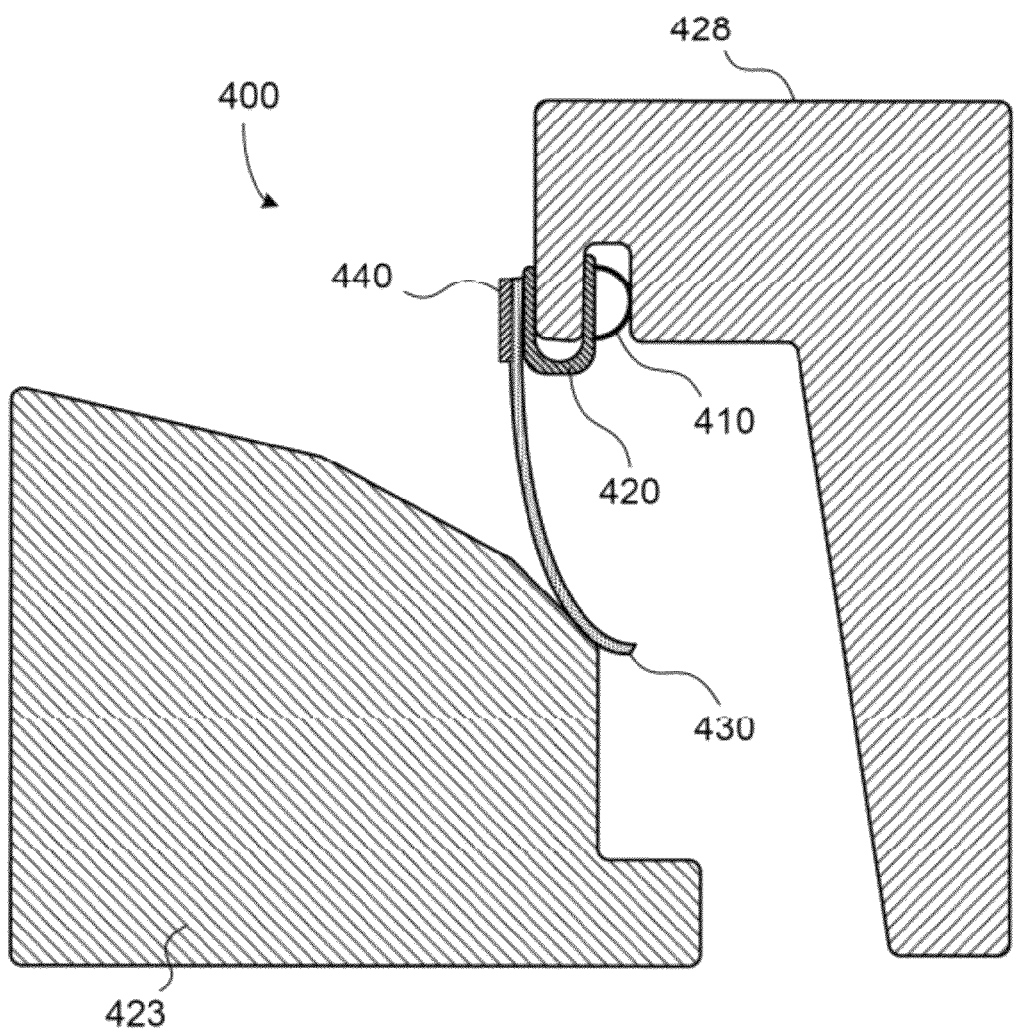
FIG. 4 illustrates a partial cross-sectional view of the seal where the seal is mounted on the stage one nozzle, according to one aspect of the present invention.

FIG. 4 illustrates a partial cross-sectional view of the seal where the seal is mounted on the stage one nozzle, according to one aspect of the present invention. The seal assembly 400 is mounted on first stage nozzle 428 and may include spring seal 410, retaining member 420, leaf seal 430 and retaining plate 440. A retention assembly may be comprised of the spring seal 410, retaining member 420 and retaining plate 440, and this retention assembly is attached to a first component. The first component in this example is the first stage nozzle 428. A seal element is secured by the retention assembly 410, 420, 440, and includes at least one leaf seal 430. The retaining plate 440 may be configured to secure the leaf seal 430 to the retaining member 420. The leaf seal 430 has a partially segmented construction and is formed of a plurality of tabs in series with a plurality of slots. The seal assembly 400 forms a flexible seal between the first component 428 and the second component 423, which in this example is the first stage nozzle 428 and transition piece 423, respectively.

FIG. 5 illustrates a partial perspective view of seal assembly 500, according to another aspect of the present invention. The seal assembly includes retaining member 520, first leaf seal 530, second leaf seal 535 and retaining plate 540. The spring seal is omitted for clarity. In addition, retaining member 520 and retaining plate 540 may be configured as a single element.

The first leaf seal 530 is placed in front of the second leaf seal 535, and the tabs 531 of the first leaf seal 530 overlap the slots 536 of the second leaf seal 535. This configuration provides good flexibility and good sealing characteristics, as leakage flow through the slots of the first leaf seal 530 are reduced by the tabs in the second leaf seal 535. In addition, a wear resistant layer 550 may be placed on all or portions of the first leaf seal 530 and/or second leaf seal 535. As shown, the wear resistant layer 550 is placed on portions of the tabs 531 of the first leaf seal 530, and this wear resistant layer 550 reduces wear experienced by relative movement between the first leaf seal 530 and the opposing surface (e.g., the first stage nozzle or the transition piece). The wear resistant layer 550 may be comprised of one or combinations of chromium, chromium carbide, chromium carbide/nickel chromium, chromium alloys, cobalt, cobalt-molybdenum-chromium-silicon, cobalt metal alloys, copper-nickel-indium, copper alloys, iron, iron alloys, nickel, nickel alloys, tungsten carbide, tungsten-carbide-cobalt, tungsten-carbide-cobalt-chromium, tungsten alloys.

FIG. 6 illustrates a partial perspective view of seal assembly 600, according to another aspect of the present invention. The seal assembly includes retaining member 620, leaf seal 630, retaining plate 640 and cloth layer 660. The spring seal is omitted for clarity. In addition, retaining member 620 and retaining plate 640 may be configured as a single element.

The cloth layer 660 functions as a wear resistant layer. The cloth layer may be comprised of a cloth material that is formed of one or more layers of cloth, and each of the layers may be comprised of a material chosen from one or combinations of metal, ceramic and polymer fibers. The layers may be formed by a woven fabric, a knitted fabric or a pressed fabric.

It is noted that the terms "first," "second," and the like, as well as "primary," "secondary," and the like, herein do not denote any amount, order, or importance, but rather are used to distinguish one element from another, and the terms "a" and "an" herein do not denote a limitation of quantity, but rather denote the presence of at least one of the referenced item. As used herein the term "about", when used in conjunction with a number in a numerical range, is defined being as within one standard deviation of the number "about" modifies. The suffix "(s)" as used herein is intended to include both the singular and the plural of the term that it modifies, thereby including one or more of that term (e.g., the layer(s) includes one or more layers).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A as turbine having a seal assembly, the seal assembly comprising:
   a seal element secured by a retention assembly, the seal element comprising at least one leaf seal, the at least one leaf seal comprising a plurality of tabs in series with a plurality of slots;
   the retention assembly attached to a transition piece, the transition piece having an inlet end generally aligned with an exhaust end of a combustion liner, and a transition piece exhaust end coupled to a stage one nozzle, the retention assembly including a retaining member disposed around a portion of the transition piece, a spring seal attached to the retaining member, and a retaining plate securing the seal element to the retaining member; and
   wherein the seal assembly forms a flexible seal between the transition piece and a first stage nozzle, and the spring seal applies a compressive force to a portion of the retaining member and a portion of the transition piece so that leakage flow between the transition piece and the first stage nozzle is reduced.

2. The gas turbine of claim 1, the at least one leaf seal further comprising:
   a first leaf seal disposed in front of a second leaf seal;
   wherein, the plurality of tabs of the first leaf seal are configured to overlap the plurality of slots of the second leaf seal.

3. The gas turbine of claim 2, wherein the first leaf seal includes a wear resistant layer disposed on the plurality of tabs.

4. The gas turbine of claim 3, wherein the wear resistant layer is comprised of one or combinations of:
   chromium, chromium carbide, chromium carbide/nickel chromium, chromium alloys, cobalt, cobalt-molybdenum-chromium-silicon, cobalt metal alloys, copper-nickel-indium, copper alloys, iron, iron alloys, nickel, nickel alloys, tungsten carbide, tungsten-carbide-cobalt, tungsten-carbide-cobalt-chromium, tungsten alloys.

5. The gas turbine of claim 1, wherein the at least one leaf seal is covered by a wear resistant layer.

6. The gas turbine of claim 5, wherein the wear resistant layer comprises a cloth material.

7. The gas turbine of claim 6, wherein the cloth material comprises one or more layers of cloth and each of the one or more layers is comprised of a material chosen from at least one or combinations of metal, ceramic and polymer fibers; and
   wherein the one or more layers are formed by a woven fabric, a knitted fabric or a pressed fabric.

8. A gas turbine having a seal assembly, the seal assembly comprising:
   a retention assembly attached to a transition piece, the transition piece having an inlet end that is generally aligned with an exhaust end of a combustion liner, the retention assembly including a retaining member disposed around a portion of the transition piece, a spring seal attached to the retaining member, the spring seal applying a compressive force to a portion of the retaining member and a portion of the transition piece;
   a seal element comprising at least one leaf seal, the at least one leaf seal comprising a plurality of tabs in series with a plurality of slots, and a retaining plate securing the at least one leaf seal to the retaining member, the at least one leaf seal covered by a wear resistant layer and the wear resistant layer comprises a cloth material; and
   wherein the seal assembly forms a flexible seal between the transition piece and a first stage nozzle, and wherein the spring seal and the retaining member reduce leakage flow between the transition piece and the first stage nozzle.

9. The gas turbine of claim 8, the at least one leaf seal further comprising:
   a first leaf seal disposed in front of a second leaf seal;
   wherein, the plurality of tabs of the first leaf seal are configured to overlap the plurality of slots of the second leaf seal.

10. The gas turbine of claim 9, wherein the first leaf seal includes a wear resistant layer disposed on the plurality of tabs.

11. The gas turbine of claim 10, wherein the wear resistant layer is comprised of one or combinations of:
    chromium, chromium carbide, chromium carbide/nickel chromium, chromium alloys, cobalt, cobalt-molybdenum-chromium-silicon, cobalt metal alloys, copper-nickel-indium, copper alloys, iron, iron alloys, nickel, nickel alloys, tungsten carbide, tungsten-carbide-cobalt, tungsten-carbide-cobalt-chromium, tungsten alloys.

12. A gas turbine having a seal assembly, the seal assembly comprising:
    a seal element secured by a retention assembly, the seal element comprising at least one leaf seal, the at least one leaf seal comprising a plurality of tabs in series with a plurality of slots;
    the retention assembly attached to a transition piece, the transition piece having an inlet end generally aligned with an exhaust end of a combustion liner, and a transition piece exhaust end coupled to a stage one nozzle, the retention assembly including a retaining member disposed around a portion of the transition piece, a spring seal attached to the retaining member, and a retaining plate securing the seal element to the retaining member; and wherein the seal assembly forms a flexible seal between the transition piece and a first stage nozzle.

13. The gas turbine of claim 12, the at least one leaf seal further comprising:

a first leaf seal disposed in front of a second leaf seal, and the plurality of tabs of the first leaf seal are configured to overlap the plurality of slots of the second leaf seal.

14. The gas turbine of claim 12, wherein the at least one leaf seal includes a wear resistant layer disposed on the plurality of tabs.

15. The gas turbine of claim 14, wherein the wear resistant layer is comprised of one or combinations of:

chromium, chromium carbide, chromium carbide/nickel chromium, chromium alloys, cobalt, cobalt-molybdenum-chromium-silicon, cobalt metal alloys, copper-nickel-indium, copper alloys, iron, iron alloys, nickel, nickel alloys, tungsten carbide, tungsten-carbide-cobalt, tungsten-carbide-cobalt-chromium, tungsten alloys.

16. The gas turbine of claim 12, wherein the at least one leaf seal is covered by a wear resistant layer.

17. The gas turbine of claim 16, wherein the wear resistant layer comprises a cloth material.

18. The gas turbine of claim 17, wherein the cloth material comprises one or more layers of cloth and each of the one or more layers is comprised of a material chosen from at least one or combinations of metal, ceramic and polymer fibers; and wherein the one or more layers are formed by a woven fabric, a knitted fabric or a pressed fabric.

\* \* \* \* \*